United States Patent [19]

Spreen

[11] Patent Number: 5,225,971
[45] Date of Patent: Jul. 6, 1993

[54] THREE COIL BRIDGE TRANSFORMER

[75] Inventor: James H. Spreen, Stone Ridge, N.Y.

[73] Assignee: International Business Machines Corporation, Armonk, N.Y.

[21] Appl. No.: 818,017

[22] Filed: Jan. 8, 1992

[51] Int. Cl.$^5$ .................. H02M 7/06; H02M 3/335
[52] U.S. Cl. ...................... 363/17; 336/184; 336/212; 336/232; 363/126
[58] Field of Search .............. 363/17, 37, 126; 336/184, 212, 232

[56] References Cited

U.S. PATENT DOCUMENTS

| | | | |
|---|---|---|---|
| 4,803,609 | 2/1989 | Gillett et al. | 363/17 |
| 4,864,486 | 9/1989 | Spreen | 336/184 |
| 4,965,712 | 10/1990 | Duspiva et al. | 363/126 |

FOREIGN PATENT DOCUMENTS 97732   8/1979   Japan .................. 363/126

OTHER PUBLICATIONS

Electronics, pp. 108-112, 114, Jun. 16, 1981.
Magnetic Circuits and Transformers, Members of the Staff of the Dept. of Electrical Engineering, Massachusetts Institute of Technology, pp. 614-615.

*Primary Examiner*—William H. Beha, Jr.
*Attorney, Agent, or Firm*—Michael J. Scheer; Robert L. Troike

[57] ABSTRACT

The magnetic core of the transformer is an E—E shaped core. The primary winding of the transformer is divided into three substantially identical planar coils, each coil being wound on one of the three separate core posts. The coils are wired in series such that a current in the primary winding will induce substantially identical magnetic fluxes in the two outer core posts, and an opposite flux in the center post. The secondary of the transformer is formed by a contact plate and a conductor frame which provide conducting paths through the window regions of the E—E core. The bottom of the core is mounted in a recess in the conductor frame. Positioned within in the conductor frame are four rectifiers which make electrical connections to the secondary contact plate. When the transformer delivers power, the voltage on the primary winding will be divided ¼ on each of the outer coils and ½ on the center coil post. During this time only two of the rectifiers will be conducting current. During freewheel times, with no primary voltage, the load current will divide evenly among the four rectifiers. During commutate intervals, between freewheel and on times, the voltage on the primary winding will divide evenly among the three coils. This novel transformer permits a switch mode power supply to supply more power while providing more even cooling.

12 Claims, 7 Drawing Sheets

FIG. 1 PRIOR ART
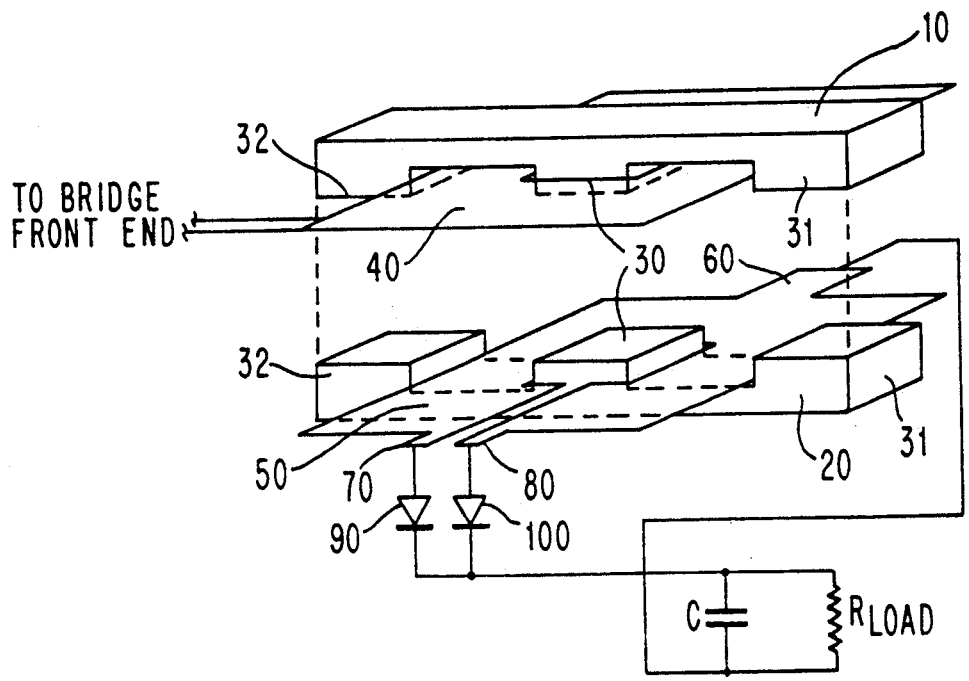
FIG. 3 BRIDGE FRONT END, PRIOR ART
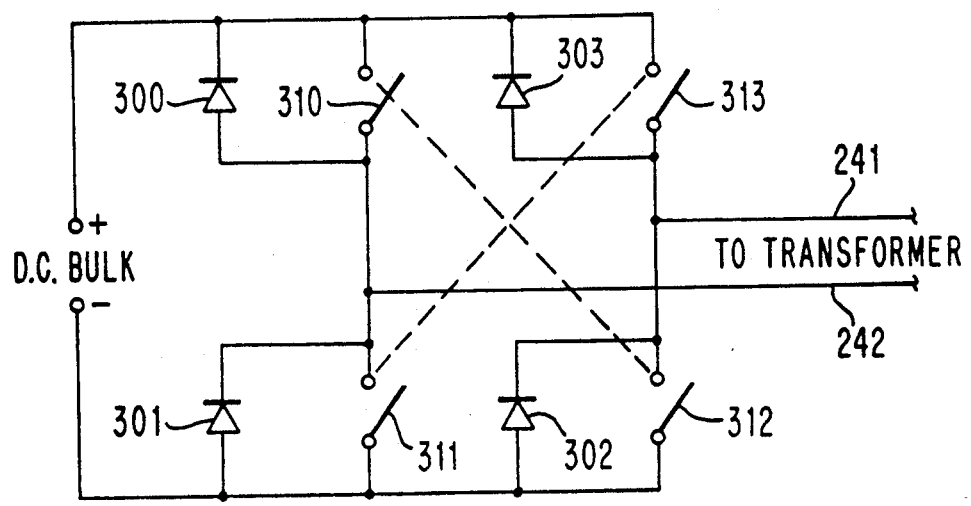

THREE COIL BRIDGE TRANSFORMER

FILED OF THE INVENTION

This invention relates generally to switch mode power supplies and more particularly to a transformer design for an improved switch mode power supply.

BACKGROUND OF THE INVENTION

As compared to single ended converter circuits, full bridge converter circuits have a number of attractive features for high power dc-dc converters, such as balanced use of the output rectifiers and reduced output filter requirements. Although the details of operation may differ for such varieties as square wave or resonant transition full bridge circuits, all well-known bridge or symmetrical drive circuits apply an alternating positive and negative voltage to the primary winding of the power transformer. In the transition period between the application of positive and negative voltage, there is an intervening zero voltage or freewheel time interval as may be required to accomplish regulation.

For high output voltage levels, such as might be used for motor drives or relays, the output from the secondary winding of the transformer is typically rectified using four rectifiers in a full bridge rectifier arrangement. However, for applications requiring low voltages and high currents, such as high performance logic circuits, the two rectifier forward voltage drops encountered in a full bridge rectifier will cause an unacceptable power loss. For these low voltage, high current applications, a center tapped secondary winding is typically used in conjunction with two rectifiers to obtain full wave rectification. This arrangement eliminates the unacceptable power loss due to the full bridge configuration since only one rectifier forward voltage drop is encountered.

In very high current applications, conventional wire cannot be employed as conductors in the secondary structure precisely because of the high current passing through the conductor. To overcome this limitation, bus bars or copper plates or disks are used to accommodate the high current in these types of transformers. A significant difficulty in using either a bus bar or a copper plate or disk for the secondary structure is that it is mechanically awkward to make the required connections (rectifier and center tap) to the secondary structure. FIG. 1 illustrates an exploded view of a prior art bridge transformer and one manner of making the connections to the secondary structure. Elements 10 and 20 are the two halves of a conventional E—E shaped magnetic core. Encircling center post 30 of the core are the primary winding, 40, and the secondary winding, 50. As illustrated in FIG. 1, the secondary structure, 50, is constructed from a solid plate or sheet of conducting material. The secondary contains a center tap piece, 60, and contacts, 70 and 80, for making connections to the anode sides of the two rectifying diodes 90 and 100. The cathode sides of the rectifiers are shown commonly connected to the external circuit (shown as a filter-load comprising a capacitor and a load resistor R in FIG. 1). The other connection to the external circuit is shown from the center tap 60. Typically the rectifiers, 90 and 100, and the connections thereto, are external to the transformer structure. For an increase in the length of the connection to the external rectifiers, there is an increase in the inductance of the transformer circuit and thereby a direct degradation in the electrical performance of the transformer. Both the rectifier connections to the secondary and the rectifier connections to each other should be as short as possible to maintain low inductance.

In high current transformer applications, the transformer will typically provide a large voltage step-down ratio and the different structural composition of the primary and secondary windings required to achieve this step-down will provide additional fabrication and assembly challenges. In such a transformer, the primary winding will contain many turns (typically on the order of 15 to 50) of relatively flexible conductor, such as wire, flat wire, or braid. In FIG. 1, the primary winding, 40, is shown as a planar, multi-turn coil of wire conductor. The primary will carry modest currents of 5 to 20 amps, peak alternating current (AC) with no direct current (DC) component. The primary winding must be insulated to withstand hundreds of volts to function, and perhaps thousands of volts to meet safety requirements. In comparison to the primary, the secondary structure contains relatively massive and inflexible parts, such as the copper contact plate, 50, shown in FIG. 1. The secondary structure will carry hundreds of amps with both AC and DC components. Fifty volts functional insulation is adequate for the secondary.

The vastly different character of the primary and secondary structures of such a transformer are likely to require different fabrication, assembly, and mounting techniques. Yet, in order to provide tight magnetic coupling between the primary and secondary structures, which is required by some high performance transformers, it is necessary that the two structures be in close physical proximity. In FIG. 1, both the primary and secondary windings are mounted on core post 30 with the secondary contact plate, 50, lying directly beneath the primary coil 40. The primary coil, 40, could be wound in a cylindrical fashion, up and down the core post to create more turns on the post, but the primary is preferably wound in a planar fashion. The planar winding is more desirable in order to effect a low profile (height dimension) for the overall transformer and to enhance magnetic coupling to the secondary structure.

It is therefore one object of this invention to improve the electrical performance of a low profile bridge transformer.

It is also an object of this invention to provide tight magnetic coupling between the primary and secondary structures of such a transformer.

It is another object of this invention to facilitate fabrication assembly and mounting of a transformer structure.

SUMMARY OF THE INVENTION

In conventional full bridge transformers, the structural design and choice of materials for the primary and secondary windings lead to difficulties in magnetic coupling, connection congestion, output filtering, heat transfer, fabrication, assembly and mounting. The transformer disclosed here addresses these problems by the use of several unique designs. The core of the present invention is an E—E core in shape, enclosing two window regions defined by a top structure, a bottom structure and three core posts. The core is preferably gapped in some manner in order to accommodate dc flux and provide for higher load currents. The primary winding is divided into three substantially identical planar coils, each coil being wound on one of the three separate core posts. The coils are wired in series such that a current in the primary winding will induce substantially identical magnetic fluxes (with respect to relative direction) in the two outer core posts, and an opposite flux (with respect to relative direction) in the center post. The secondary structure of the transformer is in the form of a conducting plate or sheet which provides conducting paths from one side of the core, through the window regions, to the other side of the core. The bottom of the core structure is mounted into a recess in a conductor frame. Embedded in the magnetic field of the transformer, within a recess in the frame, are four rectifiers which make electrical connections to the secondary contact plate. During the "on" time of the transformer operation, the switches of the primary circuit will be closed, delivering power to the transformer and the voltage imposed on the primary winding will be divided $\frac{1}{4}$ on each of the coils wound on the outer core posts and $\frac{1}{2}$ on the coil wound on the center core post. During this "on" time only two of the rectifiers will be conducting current. During the freewheel time in the operation of the transformer, the switches and diodes of the primary circuit will not be conducting, no voltage is impressed on the primary windings and the rectifiers attached to the secondary will equally share the load current. During the commutate time of the operation of the transformer, the switches in the primary circuit have either just been opened or closed and the current in the primary is rapidly decreasing or increasing. During this period, the current paths in the secondary will be driven from the configuration during the "on" state to the configuration during the freewheel state and conversely from current paths during the freewheel state to the current paths during the "on" state.

BRIEF DESCRIPTION OF THE DRAWINGS

FIG. 1 depicts an exploded view of a prior art full bridge transformer.

FIG. 3 illustrates a typical bridge front end which drives the novel transformer of the present invention.

DESCRIPTION OF THE PREFERRED EMBODIMENT

Figure 2:
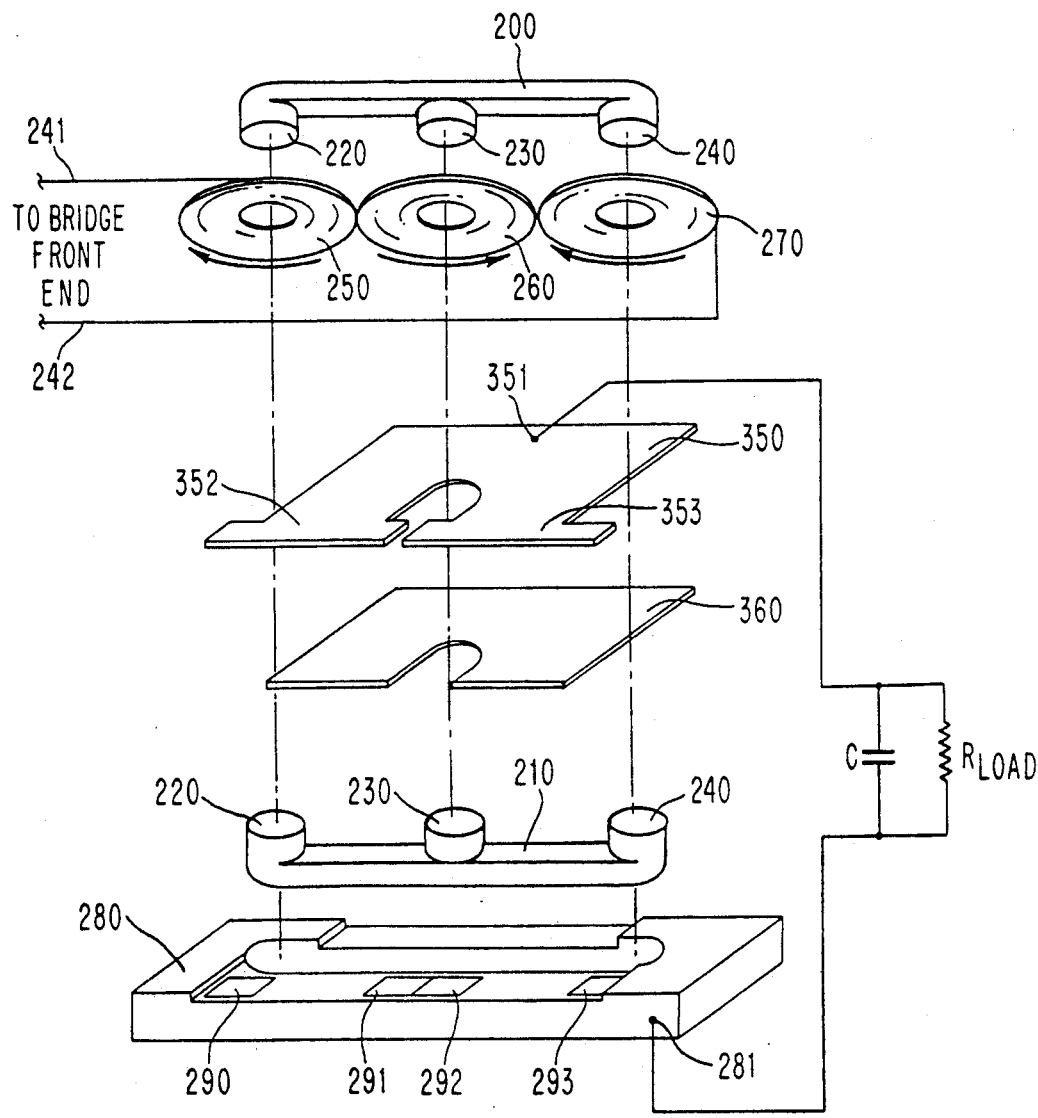
FIG. 2 shows an exploded view of a transformer embodying the present invention with three primary coils and a conductor frame.

FIG. 2 is an exploded view of the novel transformer of the present invention, showing the major elements of the structure. The magnetic core of the present transformer is formed in an E—E shape, having a top structure, 200, and a bottom structure, 210. Interconnecting the top and bottom structures are three posts or legs, 220, 230 and 240. The core structure is assembled as indicated by the dashed lines in FIG. 2. The core is fabricated from any of the well known magnetic materials such as ferrite. The core is typically constructed in a two piece fashion in order to facilitate assembly, but could also be constructed as a four piece structure. The core will preferably have the general shape as illustrated in FIG. 2. The details of the core shape depend upon the requirements of a specific application. Preferably, the core will be gapped in some fashion in order to accommodate dc flux and thereby permit higher load currents. In general, the core path through the outer legs must accommodate the dc flux associated with the load current, while the magnetic reluctance of the flux paths through the center leg, returning through the outer legs, determines the magnetizing inductance of the transformer. An appropriate core can be selected using known attributes of various core arrangements. For example, if the application requires high magnetizing inductance at modest output currents, then a core gapped along the center leg, as described in U.S. Pat. No. 4,803,609 (FIG. 8), may be appropriate. For clamp mode or quasi-resonant converter operation, for which comparable magnetizing and reflected load currents are desired, a conventional E—E core with gapped outer legs may be appropriate. The novel transformer structure disclosed here can be used with any of these known cores, which will provide some series inductive filtering in addition to the transformer function.

Each of the core posts, 220, 230 and 240, is encircled by a separate primary coil, 250, 260 and 270 respectively. Each primary coil is constructed as a multi-turn planar coil formed by a conductor shaped in a spiral pattern. The three coils are wired in series and the entire primary winding is connected via leads 241 and 242 to a bridge front end as depicted in FIG. 3 (the bridge front end is not shown in FIG. 2 for purposes of clarity). Referring briefly to FIG. 3, a conventional symmetric full bridge primary circuit comprises switches 310-313 which are coupled as indicated by the dashed lines in FIG. 3. Each of the switches has an associated clamping diode, 300-303 respectively. The purpose of the bridge front end is to apply an alternating positive and negative voltage to the primary winding of the power transformer. In the transition period between the application of positive and negative voltage, there is an intervening zero voltage or freewheel time interval as may be required to accomplish regulation. During operation of this front end, the switches are controlled from an external source such as a clock or timing pulse generator. During one phase of the clock, switches 311 and 313 will be closed and switches 310 and 312 will be open. During this phase of the clock, the configuration of switches will impress a positive bulk voltage across the input to the transformer. During the next cycle of the clock, switches 310 and 312 will close and switches 311 and 313 will open. This will cause a negative bulk voltage to be seen at the transformer input. The purpose of the clamping diodes is to conduct any transient primary current generated when the switches are transitioning from closed to opened.

Referring back to FIG. 2, the relative phasing of the primary coils, as indicated by the arrows in FIG. 2, is such that a current which produces an upward directed flux at the center of the first coil 250 will produce a downward flux in the center coil 260 and an upward flux in the coil 270. When the bridge front end to the transformer reverses the polarity of the applied voltage, the direction of the current in the primary winding will reverse, the dΦ/dt experienced in the core will reverse from its previous non-zero state, and eventually, the direction of the generated flux will reverse. Following our above example, a reversal of the applied voltage will cause a downward flux in the two outer core core posts, 220 and 240, and an upward flux in the center leg, 230.

The bottom structure of the magnetic core, 210 is fitted into a first recess in a conductor frame, 280. This recess can either be a blind hole or a through hole. The choice of which type of hole is a matter of manufacturing and assembly convenience. This choice will affect the overall height of the structure (a blind hole will result in a greater height). The frame is constructed from any suitable conducting material such as copper or a copper alloy. A copper alloy might be preferable in that it provides a more suitable material for machining. The conductor frame serves both as a structural frame for holding the transformer assembly, and further acts as a functional element of the transformer which will be more fully described later in this description. The primary winding is electrically insulated from the conductor frame, 280, and the secondary contact plate, 350. The output rectifiers for the transformer, 290–293 are placed in a second recess in the conductor frame along one side of the frame as depicted in FIG. 2. The rectifiers can take the form of of chips, "moly stack" pellets, or low profile packages as can be appreciated by one skilled in the art. Rectifier 290 is placed in the frame in a position which will lie underneath primary coil 250 when the transformer is assembled. Similarly, rectifiers 291 and 292 will lie underneath primary coil 260, and rectifier 293 will be in a position underneath coil 270. Positioning of these rectifiers underneath the primary coils is important to the operation of the transformer as will be seen during the discussion of the conduction paths of this transformer.

The secondary structure of the present transformer takes the form of a single contact plate, 350, and the conductor frame, 280. The contact plate can be made from copper, a beryllium/copper alloy, phosphor bronze or any other suitable conductive material. The contact plate, 350, provides an electrical conduction path from one side of the core, through the core windows between the posts, to the other side of the core structure. The contact plate, 350, is placed in a third recess in the conductor frame, 280. When the transformer assembly is complete, the top of the contact plate, 350, is preferably co-planar with the top of the conductor frame, 280. The bottom of the contact plate, 350, makes an electrical connection with each of the recessed rectifiers, 290–293, at the contact tabs labeled 352 and 353 on the contact plate. In order to facilitate the electrical connection between the contact plate and the rectifiers, beam or cantilever springs are mounted on the contact plate. In FIG. 2 the springs are formed as part of the plate itself and are represented as the contact tabs 352 and 353. These springs will force the connection to the top of the rectifiers when the transformer is assembled. The springs are preferably made from the same material as the contact plate. It must be noted that other than the connection to the rectifiers, the contact plate is otherwise electrically insulated from the rest of the conductor frame, 280. The insulating layer, 360 in FIG. 2, can be made of any suitable insulating material, but in the preferred embodiment is constructed from a sheet of hard anodized aluminum. This insulating sheet is designed to provide insulation against at least 50 volts and is furthermore thermally conductive to provide adequate heat dissipation. The insulator is purposely made non-resilient in order to facilitate the connection of plate tabs 352 and 353 to the rectifiers 290–293. If the insulator were constructed from a more resilient material, the spring deflection of the contact plate tabs 352, 353 would be uncertain, and the electrical connection between the contact plate tabs and the rectifiers 290–293 would be uncertain. With the non-resilient aluminum insulator, the spring deflection can be more precisely controlled. The shape of the insulator, 360, generally follows the shape of the contact plate, 350, electrically insulating the contact plate from the conductor frame, 280. There is no insulation in the area of the contact plate tabs, 352 and 353, for this is where the electrical connection to the rectifiers are made. The contact plate, 350, and contact plate tabs, 352 and 353, have been shown in FIG. 2 to be constructed from a single sheet of conducting material. The present invention is not limited by this single configuration. For example, the contact plate, 350 could be constructed from a thicker bar of conducting material, with the contact plate tabs, 353 and 353, being attached and co-planar with the top of the bar. This configuration would result in a deeper recess in the conductor frame, 280, in order to accept the thicker bar constituting the contact plate. Furthermore, the shape of the contact plate, 350 is not limited to a square as depicted in FIG. 2. The corners of the contact plate, 350 could be tapered in the region where the contact plate magnetically couples with the center coil, 260. Such a tapering might be desired in order to facilitate heat transfer in the transformer. Either of the two alternative configurations for the secondary's contact plate, 350, will not effect the electrical performance so long as they do not alter the conduction paths from the center tap, 351, through the windows of the core to the contact plate tabs, 352-353, and the rectifiers, 290–293. The output connections from the transformer assembly to the external circuit are made at the contact plate center tap, 351, and at a suitable location on the conductor frame, 281. The function performed by the center tap, 351, is to provide a connection for access to the conduction paths in the secondary winding. The location of the connection 281 on the conductor frame will influence the DC current pattern in the frame, but will not affect the commutate current paths (which will be more fully described later). The external circuit is shown as a filter, C, and a load resistor. An output inductor can be included in series as part of this output filter, but has not been shown in this figure. The transformer itself will provide series inductance, and the choice of whether or not an additional output inductor is required will depend on the particular application of the transformer.

Figure 4:
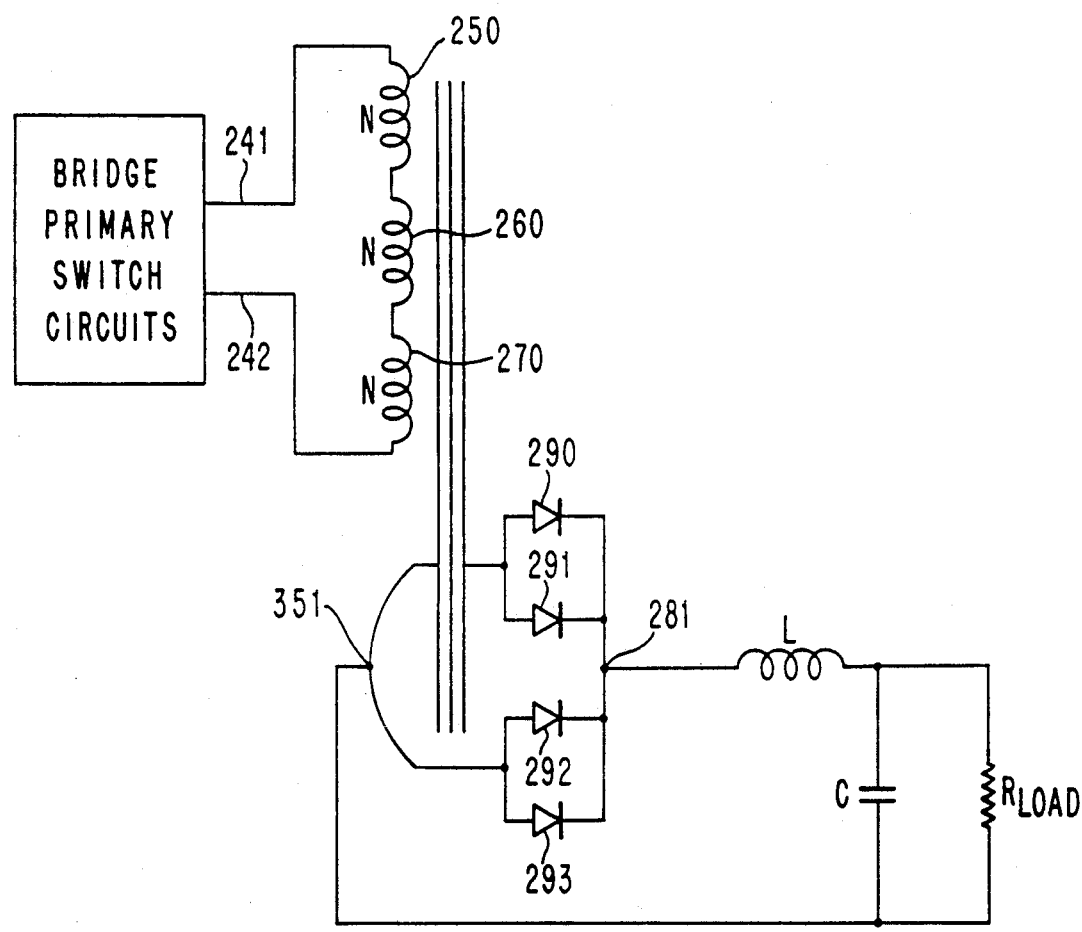
FIG. 4 is a diagram of the electrical connections of the present transformer.

FIG. 4 shows the electrical connections for the winding structure disclosed here. The primary coils 250, 260, and 270 are wired in series, and are driven by a known symmetrical circuit, such as a full bridge (as depicted in FIG. 3) or a half bridge with capacitors. The front end circuit will apply an alternating positive and negative voltage, with intervening zero voltage or freewheel time intervals as may be required for regulation. The primary coils are magnetically coupled to the secondary structure, as indicated by the triple line link in FIG. 4. In general terms, the induced voltages are such that when the primary winding voltage is positive, one pair of rectifiers, say 290 and 291, will conduct current from the transformer structure, while the other pair, 292 and 293, are reverse biased and hence will block any current flow. Conversely, for a negative primary voltage, 292 and 293 will conduct, while 290 and 291 are reversed biased and will not conduct. During any freewheel time (when no voltage is applied to the primary winding) all four rectifiers are conducting (assuming the converter is operating in the customary "continuous conduction" mode.) The frame and the contact plate are connected to the output filter and the load, illustrated in FIG. 4 as a single stage LC filter and a resistor load.

In order to understand the operation of this novel transformer structure, it is necessary discuss of the interaction of the of the primary coils, 250, 260 and 270, the magnetic core, the secondary contact plate, 350, and the conductor frame 280. There are essentially three states of operation of the transformer which need to be analyzed. The first state is when a voltage (either positive or negative) is being applied to the primary winding. This period of operation will be called the "on" time of the transformer. A second state of operation is the period when the switches in the primary circuit have just opened or closed and this time will be called the commutate interval. The third state is called a freewheel state when there is no voltage being applied to the primary winding and the transformer is not delivering any power to the load.

During the "on" time of the transformer, it is desirable to promote equal current sharing between the rectifiers that are conducting current at that particular time. In order to encourage this equal current sharing, the number of turns in each primary coil is the same, as indicated by the label "N" for each coil in FIG. 4. However, even though the coils all have an equal number of turns, the time rate of change of the magnetic flux, dO/dt, in the center leg of the core is equal to the negative of the sum of the dO/dt in both outer legs. This situation is caused by the physical construction of the E—E core. The flux which is generated in the outer posts, 220 and 240 by the primary windings 250 and 270, has no place to travel except back through the center core post 230. Therefore, the magnitude of the time rate of change of the flux in the center core post will be twice that of the dO/dt in either of the outer core posts. The functional result of this differential is that, during the time the transformer delivers power (not during the freewheel time), the center coil, 260 operates at twice the voltage/turn of either of the two outer coils 250 or 270. For example, if 300 volts is applied to the primary winding, 150 volts will appear across center coil 260, 75 volts appears across coil 250, and 75 volts appears across coil 270. This is true even though all three coils have the same number of turns and may be of identical construction.

Figure 5:
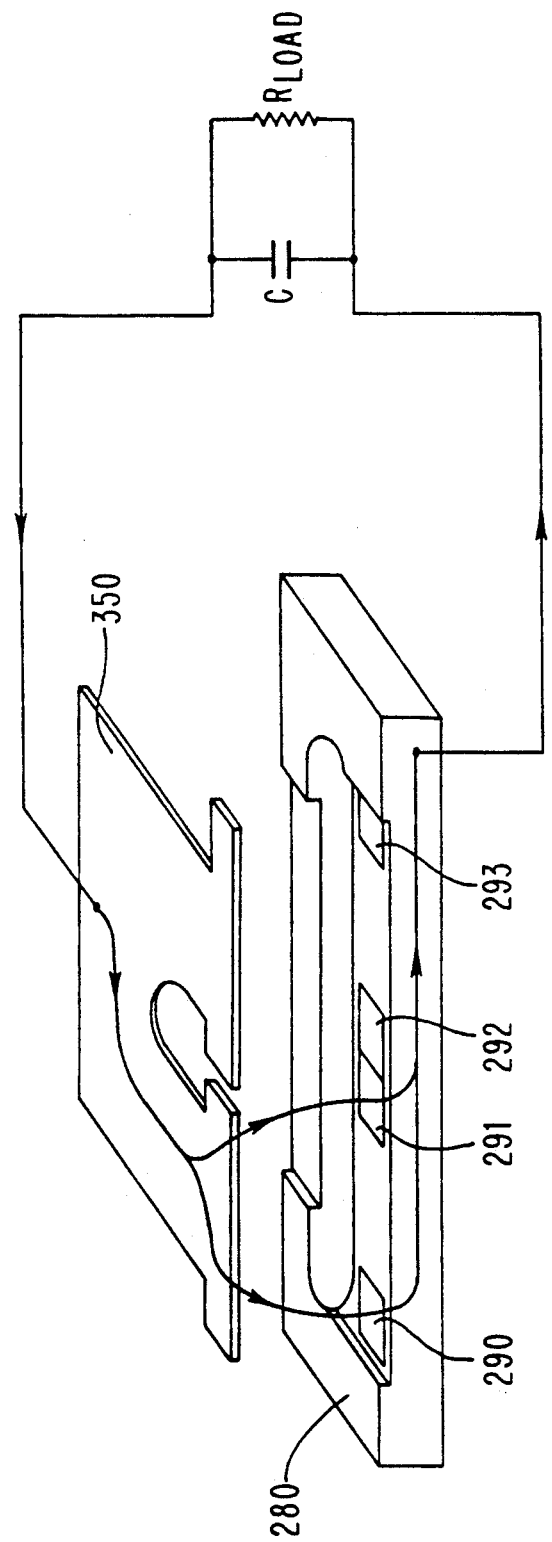
FIG. 5 illustrates a conducting path in the secondary of the structure of FIG. 2 during the "on" time of the transformer operation.

During the "on" time, only two of the four rectifiers will be conducting current, the other two being reversed biased. If the current is flowing in the primary coils in the manner depicted in FIG. 2, the current in the secondary will flow from the center tap 351, forward to contact tab 352, down through rectifiers 290 and 291, through the frame and the load circuit and back to the center tap 351. FIG. 5 illustrates this conduction path of current in the secondary circuit during an "on" time of the transformer. As can be readily appreciated, when the voltage on the primary is reversed, the direction of the primary current will be reversed, the direction of current in the secondary will be reversed and therefore rectifiers 290 and 291 will be reverse biased and rectifiers 292 and 293 will each carry ½ of the load current.

Now turning to the more complicated state of operation of the transformer during the commutate interval when the switches in the primary circuit have just been opened or closed. During the commutate time intervals, current in the secondary circuit is making the transition from one conducting path to another. If the transition is from a state where rectifiers 290 and 291 are each carrying ½ of the load current (as in FIG. 5), the eventual state (at the end of the commutate interval) is when each of the rectifiers will be carrying ¼ of the total load current. During these commutate intervals, the voltage across the primary coils divides in proportion to the impedance of the secondary current commutate path, reflected back to each primary coil. This impedance is usually dominated by the leakage inductance of the transformer. Therefore, if the three primary coils are of identical construction, and the secondary structure has been designed for low leakage inductance (i.e. to allow induced secondary currents to follow paths which geometrically match the primary winding), then during the commutate intervals, the voltage across the primary coils will divide approximately evenly: ¼, ½, ¼. Normally, the key then is to have the conduction paths in the secondary, match the geometry of the primary windings.

Figure 6:
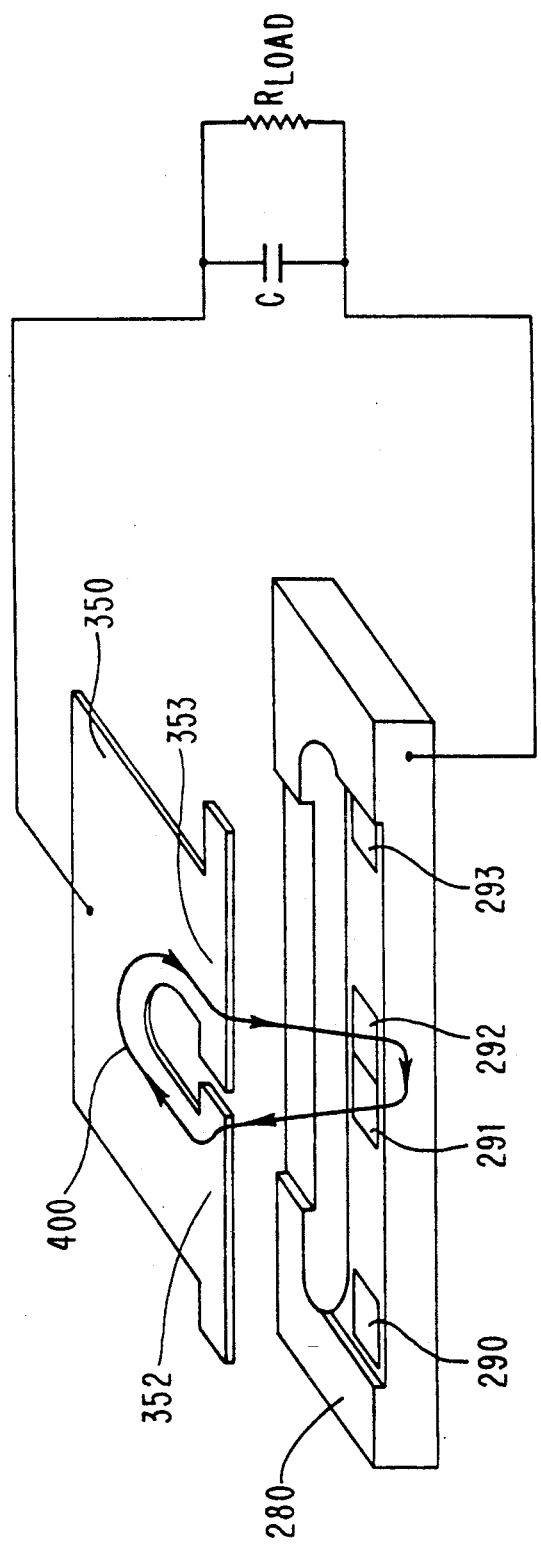
FIG. 6 shows a first conducting path in the secondary of the structure of FIG. 2 during the commutate interval of the transformer operation.
Figure 7:
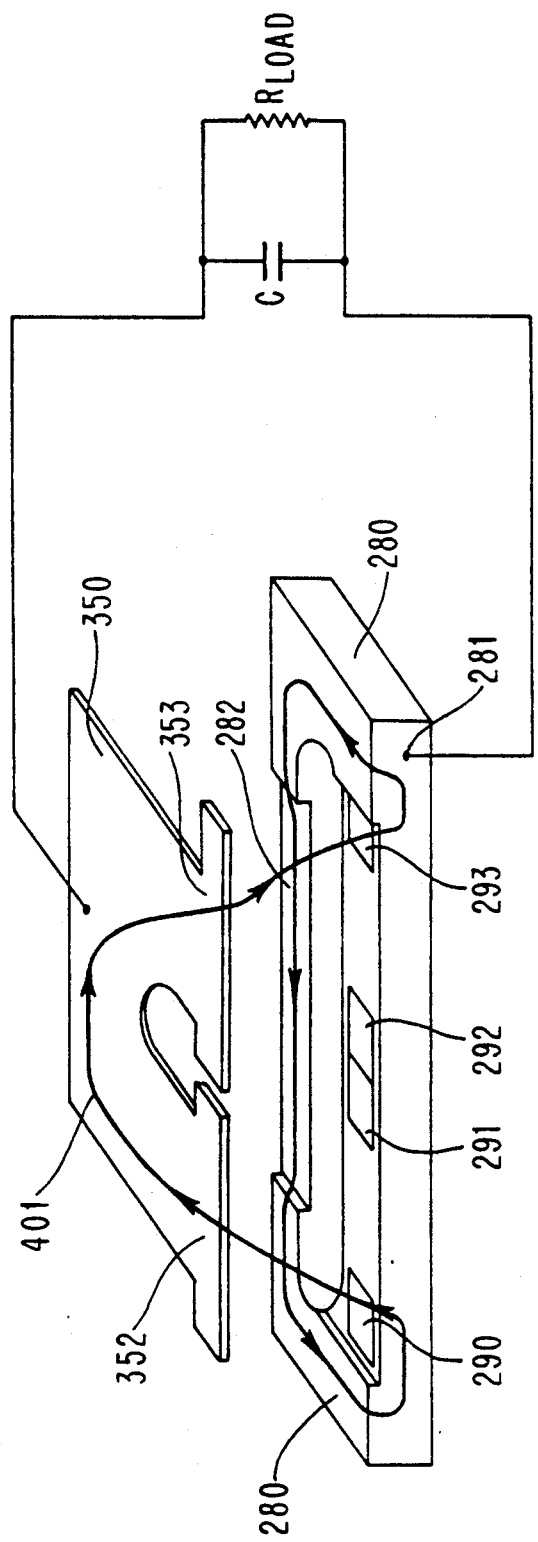
FIG. 7 shows a second conducting path in the secondary of the structure of FIG. 2 during the commutate interval of the transformer operation.

Looking at FIGS. 6 and 7, the commutation paths for the rectifier currents during the commutate interval may be decomposed into two paths. A first path (400 in FIG. 6) commutates current between rectifiers 291 and 292 with the current being induced by the center coil 260. A second commutation path (401 in FIG. 7) is for commutating current between rectifiers 290 and 293, for the current being induced by coils 250 and 270. Assuming that at the beginning of the interval, the primary winding current is flowing as depicted in FIG. 2, rectifier 291 will initially be carrying ½ of the load current and rectifier 292 will be conducting zero current. As the current in the center primary coil, 260, decreases, a current in the secondary structure will begin to flow in an opposite direction through the core window. In FIG. 6, this current in the secondary is shown to travel a commutation path from the contact plate, down through rectifier 292, through the frame, back up through rectifier 291, around the hole in the contact plate and back down to rectifier 292. As current travels this path, it will tend to subtract from the ½ load current that was conducting through rectifier 291, and add to the zero current through rectifier 292. Eventually, at the end of the commutate interval, both rectifiers 291 and 292 will each carry the same current (being ¼ of the total load current.)

The second commutation path is a bit more difficult to trace, but can be seen as illustrated in FIG. 7. As the current in the outer primary coils 250 and 270 decreases, a current in the secondary will travel from the contact plate at the contact tab 353, down through rectifier 293, along the side of the conductor frame 280, along the back of the conductor frame at point 282, back toward the front of the conductor frame on the other side, back up through rectifier 291, into the contact plate at the contact tab 352 and back around the hole in the contact plate. As with the commutation path described in FIG. 6, as this current travels this second path illustrated in FIG. 7, it will tend to subtract from the 1/2 load current that was conducting through rectifier 290, and add to the zero current through rectifier 293. Again, at the end of the commutate interval, both rectifiers 290 and 293 will each carry the same current (being ¼ of the total load current).

The two commutate paths shown in FIGS. 6 and 7 have significantly different inductances. (In a tightly coupled structure designed with identical primary coils, the inductance of the FIG. 7 current path is approximately twice that of the FIG. 6 path.) In any conventional winding arrangement, such a disparity between two commutate paths would cause unequal current sharing and thus result in unbalanced rectifier power dissipation. In the three coil winding structure disclosed here, the voltages on the primary coils during the commutate time are automatically apportioned to reflect the differences in the commutate paths. The commutate loop with the larger impedance automatically obtains a larger induced voltage, so that it can commutate the same current in the same time as the lower impedance loop. Thus, this winding arrangement encourages equal current sharing between the rectifier pairs without requiring geometrically similar commutate current paths.

The third state of operation of the transformer is called the freewheel state. During this period, no voltage is applied to the primary windings, no change in the flux is being generated and therefore no power is being delivered by the transformer. In this state, the commutate interval has driven all four rectifiers to equally share the load current. The rectifiers are "freewheeling" and if left in this state, the load current would eventually decay to zero.

Summarizing the various states of operation of the present transformer, when the transformer is "on", the voltage in the primary winding will divide ¼ to each outside coil (250 and 270) and ½ to the center coil, 260. During these times, the load current in the secondary will be conducted only through one pair of rectifiers, either 290 and 291 or 292 and 293 (depending on the phase of the voltage applied to the primary winding). The rectifiers which are conducting will equally divide the load current, ½ of the load through each rectifier. When the transformer is in a freewheel state, there is no voltage on the primary winding and the four rectifiers will equally share the load current. During the commutate interval, the voltage on the primary winding will evenly divide, ⅓ of the total across each of the coils 250, 260 and 270 and the rectifier currents will be driven from the "on" configuration to the freewheel state (or from the freewheel state to the "on" configuration).

As compared to a winding arrangement with a single primary coil, such as is illustrated in U.S. Pat. No. 4,803,609 (FIG. 4), the three coil primary winding has at least two advantages. First, it allows separation of the rectifiers to improve rectifier cooling, while encouraging equal rectifier current sharing. Secondly, it separates the primary coils, thus lowering the thermal density for better primary winding cooling, and it allows for the possibility of additional filtering of transformer capacitive current. The primary winding conduction loss and the effective leakage inductance may be slightly larger in the three coil structure, but the differences are of small magnitude, and are sensitive to the details of the coil construction. Furthermore, as compared to a winding arrangement with two primary coils, such as is illustrated in U.S. Pat. No. 4,803,609 (FIG. 7), the three coil primary winding will experience less primary winding conduction losses and less leakage inductance.

Although all of the illustrations in this description have shown the rectifiers positioned in the frame under the primary coils, these rectifiers may be positioned external to the transformer. Such an arrangement would display increased commutate loop inductance, but may be preferred if conventionally packaged and mounted rectifiers must be used.

Figure 8:
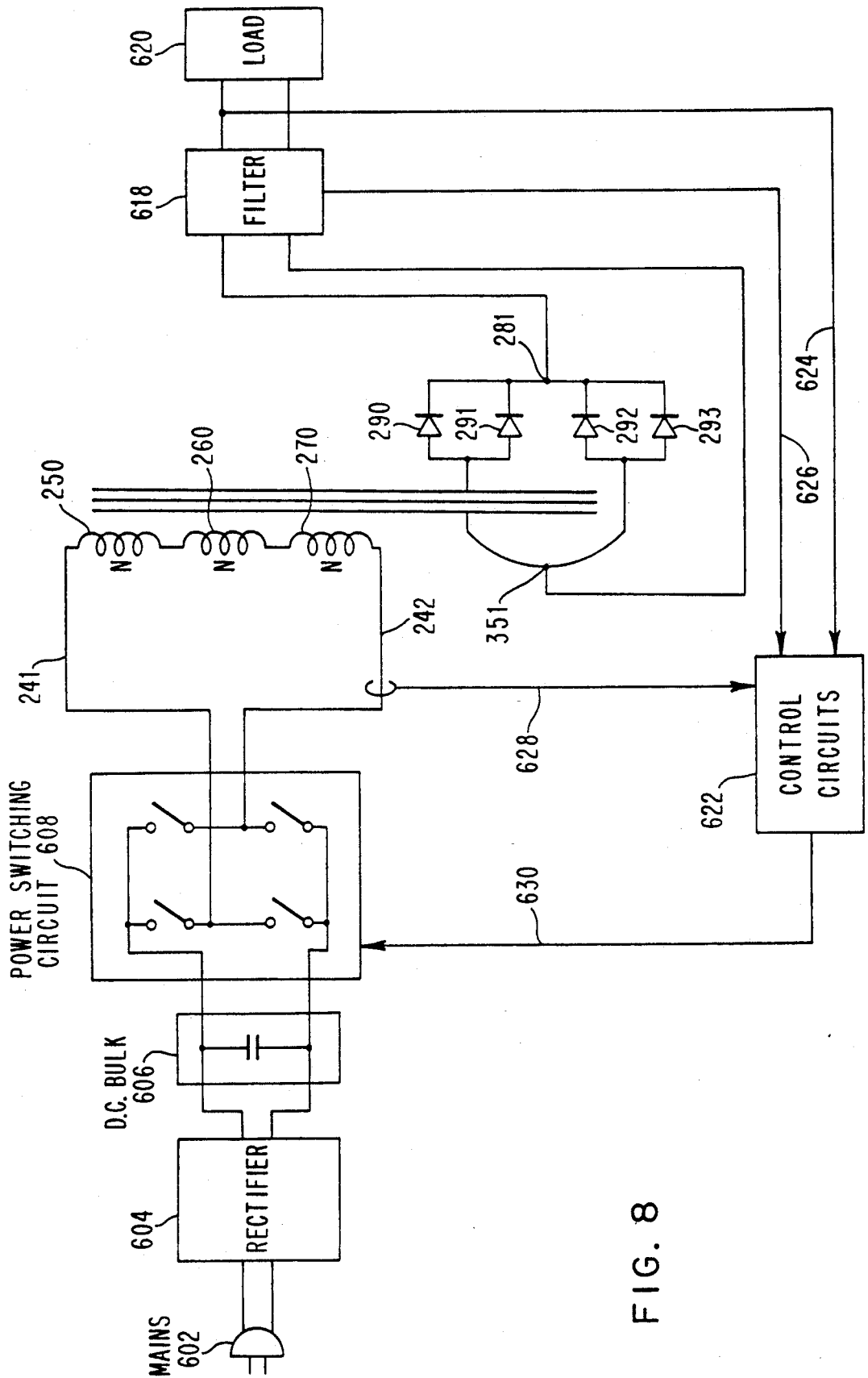
FIG. 8 depicts a block diagram of a switch mode power supply incorporating the novel transformer structure.

FIG. 8 is a block diagram of a switch mode power supply incorporating the novel transformer structure according to the present invention. The connection to some utility power main, which may be, for example, 50 to 60 Hertz, single or three phase, 120 to 240 volts alternating current (ac), is represented in FIG. 8 by the stylized plug 602. This ac power is rectified by an appropriate rectifier arrangement 604. The resulting unregulated direct current (dc) power may be filtered and stored in a "bulk" capacitor 606, with a bulk voltage in the range of 150 to 400 volts dc. This unregulated voltage is then fed to additional circuitry which functions as a dc-dc converter with regulation.

The first step in the dc-dc conversion is the generation of high frequency power by the power switching circuit 608. The power switching circuits produce a symmetric drive to the transformer, supplying an alternating negative and positive voltage to the primary winding of the transformer. Examples of such circuits are a half bridge with capacitors or a full bridge front end as depicted in FIG. 3 and suggested by the diagram in 608 in FIG. 8. As an alternative to the switch and clamping diode depicted in FIG. 3, the switching devices may be, for example, bipolar transistors or power field effect transistors. The switching times of the devices are determined by appropriate signals 630 from the control circuits 622, in order to achieve regulation of the voltage at the load 620. The fundamental switch frequency of the devices may be in range of 20 Kilohertz to 1 Megahertz. In each application, the specific operating value or range of values is determined by engineering judgment, balancing various competing aspects well known in the art.

The symmetric, high frequency ac voltage from the switching circuit, 608 is applied to the primary winding leads 241 and 242 of the power transformer. The ac voltage on the transformer secondary is rectified by rectifiers 290–293 as described elsewhere in this description. Once rectified, the transformer output is filtered by some appropriate filter 618 designed with approaches well known in the art, to provide filtered and regulated dc voltage to the load 620. As stated previously, the transformer itself will provide some inductive filtering.

The control circuits 622 are part of a closed loop control system which provides regulation of the output voltage to a predetermined value, in spite of variations of such quantities as the bulk voltage, load current, and device characteristics. The control circuits adjust the switch timing of the switch devices in the power switching circuit 608 to maintain this desired load voltage. This adjustment is performed using the sensed value of the output voltage, as indicated by the sense line 624 in FIG. 8. More sophisticated controls, well known in the art, may sense some variables in the output filter, shown by sense line 626, and may sense the primary winding current, shown by sense line 628.

While particular embodiments of the present invention have been shown and described, it will be understood by those skilled in the art that modifications may be made to a particular embodiment without departing from the true spirit and scope of the present invention.

I claim:

1. A transformer comprising:
   a core of magnetic material having a left post, a center post, a right post, a top structure and a bottom structure, said core defining two window regions;
   said core posts being respectively encircled by left, center and right primary coils, said coils forming a primary winding;
   a contact plate providing conduction paths from a first end of said contact plate on a first side of said core, through said window regions to a second end of said contact plate on a second side of said core; and
   said second end of said contact plate being electrically connected to a plurality of rectifiers.

2. A transformer as described in claim 1 wherein:
   said coils of said primary winding being substantially co-planar and connected in series, whereby current flows in a same relative direction in said left and right primary coils, and in an opposite relative direction in said center primary coil.

3. A transformer as described in claim 1 wherein:
   said bottom structure of said core is disposed in a first recess in a conductor frame; and
   said contact plate is disposed in a second recess in said conductor frame.

4. A transformer as described in claim 3 wherein:
   a first rectifier is positioned beneath said left primary coil;
   second and third rectifiers being positioned beneath said center primary coil; and right primary coil.

5. A transformer as described in claim 4 wherein:
   said rectifiers and said first end of said contact plate are connected to an output circuit comprising an output filter and a load.

6. A power supply with increased cooling and power capability comprising:
   a first conversion means for converting low frequency alternating current into high frequency alternating current;
   a transformer having as an input said high frequency alternating current, said transformer providing transformed high frequency alternating current as an output;
   said transformer having a core of magnetic material having a left post, a center post, a right post, a top structure and a bottom structure, said core defining two window regions;
   said core posts being respectively encircled by left, center and right primary coils, said coils forming a primary winding;
   a contact plate providing conduction paths from a first end of said contact plate on a first side of said core, through said window regions to a second end of said contact plate on a second side of said core; and
   said second end of said contact plate being electrically connected to a plurality of rectifiers, said rectifiers forming a second conversion means for converting said transformed high frequency alternating current into direct current.

7. A power supply in accordance with claim 6 wherein:
   said coils of said primary winding being substantially co-planar and connected in series, whereby current flows in a same relative direction in said left and right primary coils, and in an opposite relative direction in said center primary coil.

8. A power supply in accordance with claim 7 wherein:
   said bottom structure of said core is disposed in a first recess in a conductor frame; and
   said contact plate being disposed in a second recess in said conductor frame.

9. A power supply in accordance with claim 8 wherein:
   a first rectifier being positioned beneath said left primary coil;
   second and third rectifiers being positioned beneath said center primary coil; and
   a fourth rectifier being positioned beneath said right primary coil.

10. A power supply in accordance with claim 9 further comprising;
    a control means connected to said first conversion means for providing regulation of said direct current.

11. A power supply in accordance with claim 9 wherein said first conversion means further comprises;
    an alternating current rectifying means connected to an alternating current power main for supplying rectified direct current;
    a bulk storage means for storing said rectified direct current;
    a switching means connected to said bulk storage means, said switching means supplying said high frequency alternating current to said transformer.

12. A power supply in accordance with claim 9 further comprising:
    a filtering means following said second conversion means for filtering said direct current.

* * * * *